United States Patent
Kasper, II

(10) Patent No.: US 7,512,142 B2
(45) Date of Patent: Mar. 31, 2009

(54) MANAGING A FINITE QUEUE

(75) Inventor: David J. Kasper, II, Aliso Viejo, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1218 days.

(21) Appl. No.: 10/307,213

(22) Filed: Nov. 27, 2002

(65) Prior Publication Data

US 2004/0100943 A1    May 27, 2004

Related U.S. Application Data

(63) Continuation-in-part of application No. 10/303,138, filed on Nov. 21, 2002, now Pat. No. 7,237,204, and a continuation-in-part of application No. 10/303,091, filed on Nov. 21, 2002, now Pat. No. 7,237,206.

(51) Int. Cl.
   H04L 12/50    (2006.01)
   H04Q 11/00    (2006.01)
   G06F 15/173   (2006.01)

(52) U.S. Cl. .................. 370/412; 370/359; 709/226; 715/736

(58) Field of Classification Search .......... 370/329, 370/229–235, 341–412; 709/226–232; 710/33–56; 714/763; 715/736–805
See application file for complete search history.

(56) References Cited

U.S. PATENT DOCUMENTS

| | | | | |
|---|---|---|---|---|
| 5,122,988 A * | 6/1992 | Graeve | .................. | 365/219 |
| 5,615,355 A * | 3/1997 | Wagner | .................. | 711/167 |
| 5,651,131 A * | 7/1997 | Chesley | .................. | 711/106 |
| 5,844,980 A * | 12/1998 | Patel et al. | .................. | 379/88.22 |
| 5,887,167 A * | 3/1999 | Sutton | .................. | 719/314 |
| 5,969,705 A * | 10/1999 | Fisher et al. | .................. | 715/764 |
| 6,073,163 A | 6/2000 | Clark et al. | | |
| 6,170,003 B1 * | 1/2001 | Benkual et al. | .................. | 709/214 |
| 6,424,636 B1 * | 7/2002 | Seazholtz et al. | .................. | 370/295 |
| 6,449,671 B1 * | 9/2002 | Patkar et al. | .................. | 710/107 |
| 6,460,152 B1 * | 10/2002 | Demidov et al. | .................. | 714/723 |
| 6,715,009 B1 * | 3/2004 | Perloff | .................. | 710/56 |
| 6,937,613 B1 * | 8/2005 | Bedrosian | .................. | 370/465 |
| 6,973,600 B2 * | 12/2005 | Lau et al. | .................. | 714/704 |
| 6,985,550 B2 * | 1/2006 | Blake | .................. | 375/356 |
| 7,006,441 B1 * | 2/2006 | Choudhury et al. | .................. | 370/236 |
| 7,051,249 B2 * | 5/2006 | Pham | .................. | 714/704 |
| 7,099,926 B1 * | 8/2006 | Ims et al. | .................. | 709/217 |
| 2002/0062356 A1 * | 5/2002 | Clarke et al. | .................. | 709/213 |
| 2002/0069319 A1 * | 6/2002 | Lee et al. | .................. | 711/106 |
| 2003/0088690 A1 * | 5/2003 | Zuckerman et al. | .................. | 709/232 |
| 2004/0041697 A1 * | 3/2004 | Nattkemper et al. | .................. | 340/310.01 |

(Continued)

FOREIGN PATENT DOCUMENTS

WO       0072514       11/2000

*Primary Examiner*—M. Phan
(74) *Attorney, Agent, or Firm*—Fogg & Powers LLC

(57) ABSTRACT

A source process communicates with a sink process by writing messages to a finite queue. The source process determines whether the finite queue is full. If the source process determines that the finite queue is full, the finite queue is emptied and a refresh-all message is written to the finite the queue. When the sink process reads a refresh-all message from the finite queue, the sink process performs a refresh-all operation in which a refresh operation is performed for each member of a set of objects.

27 Claims, 4 Drawing Sheets

U.S. PATENT DOCUMENTS

2004/0100980 A1* 5/2004 Jacobs et al. ............... 370/412
2006/0133396 A1* 6/2006 Shah et al. ................. 370/412
2006/0155894 A1* 7/2006 Pennington ................. 710/52

* cited by examiner

MANAGING A FINITE QUEUE

RELATED APPLICATIONS

The present application is a Continuation-In-Part (CIP) of the following U.S. Patent applications incorporated herein by reference as if fully set forth: application Ser. No. 10/303,138, filed on 21 Nov. 2002, titled "CHANGE DETECTION IN A GRAPHICAL USER INTERFACE" (issued as U.S. Pat. No. 7,237,204) and application Ser. No. 10/303,091, filed on 21 Nov. 2002, , titled "MESSAGE PASSING IN A GRAPHICAL USER INTERFACE," (issued as U.S. Pat. No. 7,237,206).

TECHNICAL FIELD

The following description relates in general to the recovery from or avoidance of an overload of a coupling between a source and a sink process and more particularly to a system and method for efficient and reliable recovery from an overload of a coupling of a source process that generates and passes messages to a finite queue and a sink process that reads the messages from the queue and provides an output for system users.

BACKGROUND

Software-based systems typically include some type of user interface for human-computer interaction by which a system obtains input from users and provides output. A user may provide such input via an input device such as a keyboard and/or a mouse that is attached to, or is in communication with, the system. The system may display output on an output device such as a computer monitor that is attached to, or is in communication with, the system.

One type of user interface is a graphical user interface ("GUI"). A GUI typically uses menus and/or other user interface controls to obtain input from the user and windows and/or screens to display information for the user. A window (or other GUI element such as a screen) is typically constructed from one or more visual components such as text fields, images, scroll bars, and the like. The window is displayed by drawing each component of the window on the display. Typically, this involves drawing the visible portions of each component. A portion of a component may not be visible, for example, because that portion has scrolled out of the window or has otherwise been hidden from view. The components can be created using, for example, text or bitmapped images. Examples of GUIs may be found in the WINDOWS operating systems, available from Microsoft Corporation.

One application for a graphical user interface is in embedded systems. For example, a high-speed digital subscriber line 2 (HDSL2) line interface card typically includes an embedded control program that may be accessed by a GUI. The GUI enables a user to view and/or change various operating parameters for the line interface card and to monitor system performance. In some implementations, the line card includes a craft port (for example, a RS-232 serial port) to which a user physically connects a portable computer or other device to communicate with the embedded control program. In some other implementations, the embedded control program and the user may communicate via an embedded operations channel included in the main HDSL2 data link provided by the line interface card.

SUMMARY

In general, in one aspect, a method of managing a queue includes, when the queue is full, emptying the queue and writing a refresh-all message into the queue.

In general, in another aspect, a program includes a storage medium tangibly embodying program instructions for managing a queue. The program instructions include instructions operable to cause at least one programmable processor to, when the queue is full, empty the queue and write a refresh-all message into the queue.

In general, in another aspect, a line interface unit includes an upstream interface adapted to couple the line interface unit to an upstream communication link. The line interface unit further includes a downstream interface adapted to couple the line interface unit to a downstream communication link. The line interface unit further includes an input-output interface adapted to couple the line interface unit to an external device. The line interface unit further includes a programmable processor coupled to the upstream interface, the downstream interface, and the input-output interface. The line interface unit further includes a storage medium coupled to the programmable processor, tangibly embodying program instructions. The program instructions include instructions operable to cause the programmable processor to, when the queue is full, empty the queue and write a refresh-all message into the queue.

In general, in another aspect, a system includes a source process, a sink process, and a queue coupled to the source process and the sink process. The source process, when the queue is full, empties the queue and writes a refresh-all message to queue. The sink process reads the refresh-all message from the queue and performs a refresh-all operation in response to refresh-all message.

Advantages of the embodiment described here may include one or more of the following. The embodiments described here may be used to add to the reliability and synchronization of communication between a source process and a sink process by reducing the occurrence of message lost resulting from queue overflow conditions. Moreover, the embodiments may result in more efficient use of processing resources, which can be useful in those embedded applications where it is desirable to limit the amount of processing resources needed for user interface management.

DRAWINGS

DETAILED DESCRIPTION

In the following detailed description, reference is made to the accompanying drawings that form a part hereof, and in which are shown by way of illustration specific embodiments in which the invention, as claimed, may be practiced. It is to be understood that other embodiments may be utilized and structural changes may be made without departing from the scope of the claimed invention.

Figure 1:
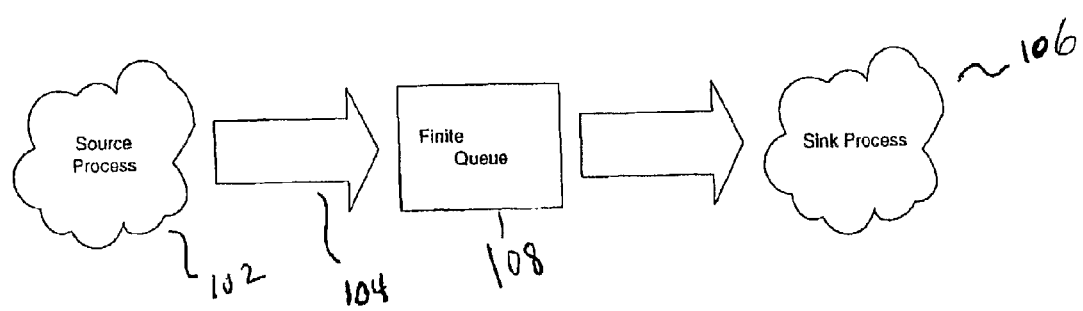
FIG. 1 is a block diagram of one embodiment of a system that shares messages between a source process and a sink or destination process.

FIG. 1 shows one example of a system that shares messages between a source process 102 and a sink or destination 106 process via a finite queue 108. In this example, source process 102 generates messages 104 that are written to finite queue 108. The sink process 106 reads the messages 104 from the finite queue 108. Source process 102 and sink process 106 typically operate independently and are not directly coupled together so that source process 102 is able to continue to produce messages without waiting for sink process 106 to finish processing any previous messages. In order to preserve the messages generated by source process 102 until sink process 106 is able to process them, the finite queue 108 is used to store the messages until the sink process 106 is ready.

Although the following describes a particular embodiment involving the management of a user interface, it is to be understood that, in other embodiments, the techniques disclosed here are used for other applications. In one embodiment, sink process 106 manages a user interface that is displayed for a user on an output device such as a monitor. The user interface includes one or more user interface components (such as windows, screen, fields, and the like) from which the user interface is constructed. In such an embodiment, source process 102 includes a database manager that manages a database. The database manager writes messages to the finite queue 108 indicating when all or a portion of the user interface should be updated (for example, when a change occurs to an item of data stored in the database that is used to display a component of the user interface). The sink process 106 reads the message from the finite queue 108 and retrieves any items of data associated with the message from the database by requesting the items from the database manager. The sink process 106 then uses the retrieved items of data to update and redisplay the user interface. The messages 104 include information (for example, object identification codes, addresses, and the link) that is used by the sink process 106 to identify which items of data stored in the database are associated with the message. Additional detail concerning such an embodiment is found in the following co-pending U.S. patent applications, incorporated herein by reference as if fully set forth: application Ser. No. 10/303,138 filed on 21 Nov. 2002, titled "CHANGE DETECTION IN A GRAPHICAL USER INTERFACE" and application Ser. No. 10/303,091 filed on 21 Nov. 2002, titled "MESSAGE PASSING IN A GRAPHICAL USER INTERFACE."

In general, the messages 104 include at least two types of messages. One type of message is a "refresh-all" message that indicates that a refresh-all operation should be carried out. A refresh-all operation performs a refresh operation for each member of a set of objects. A second type of message is an "update-component" message, which indicates that a refresh operation should be performed for one member of a set of objects that is associated with the message. For example, in the embodiment in which the sink process 106 manages a user interface as discussed above, when a user interface is first displayed, a single "refresh-all" message is sent by writing the refresh-all message to the finite queue 108. The refresh-all message indicates that the user interface should be displayed by displaying each component of the user interface on an output device. When the sink process 106 reads such the refresh-all message from the finite queue 108, the sink process 106 retrieves each item of data stored in the database that is used to draw the entire user interface by requesting such items from the database manager. The sink process 106 then uses the retrieved items to display each component from which the user interface is constructed. Sending a single refresh-all message (instead of, for example, sending multiple update-component messages) can reduce the amount of processing resources used to display all the components of the user interface since fewer messages need be sent.

In such embodiment, when an item of data used to display one or more components of the user interface changes, an update-component message associated with each changed component is sent by writing the message to the finite queue 108. Each update-component message indicates that a component associated with the message should be updated and redisplayed. When the sink process 106 reads such an update-component message, the sink process 106 retrieves any items of data stored in the database that are used to draw the component associated with the update-component message by requesting such items from the database manager. The sink process 106 then uses the retrieved items to display the component of the user interface associated with the message. This allows the user interface to be updated on a component-by-component basis as changes occur to the items of data used to display the various components. In other words, only those components having changed component data need be updated and redisplayed, which can reduce the amount of processing resources used to update the user interface.

Finite queue 108 is implemented in a number of ways. In one example, finite queue 108 is implemented using a memory device such as a dual ported memory. Such a dual-ported memory is accessed by two processes at the same time. In other examples, finite queue 108 is implemented using a statically allocated data structure such as a circular buffer. In one implementation of such an example, such a data structure is globally defined so that it is shared by more than one program or process. In another implementation, a pointer or other reference to such a data structure is used to access the finite queue 108. Still other examples and implementations of finite queue 108 will be apparent to those of ordinary skill in the art.

Because the queue 108 is finite, the queue 108 uses a predetermined amount of system resources (such as memory). However, the finite nature of queue 108 also means that the number of messages 104 that can be stored in the finite queue 108 is also finite. Rate throughput mismatches between source process 102 and sink process 106 can result in lost messages due to queue overflows that occur when the queue 108 is full. A rate throughput mismatch may arise if source process 102 rapidly generates a large volume of messages that exceeds the storage capacity of the finite queue 108 before the sink process 106 is able to process existing messages in the queue 108. In another example, a lower priority sink process 106, such as a process that managers a user interface, may become preempted for an extended period of time while a higher priority source process 102 (such a database manager process) steadily continues to write messages 104 to the finite queue 108. An overflow condition occurs when finite queue 108 becomes full and messages 104 can no longer be stored in the queue. When the queue 108 is full and messages are being lost, sink process 106 may be unaware that and continue to process messages 104 in the queue 108 without taking into account that some messages have been lost. This can lead to errors in the processing performed by sink process 106.

Figure 2:
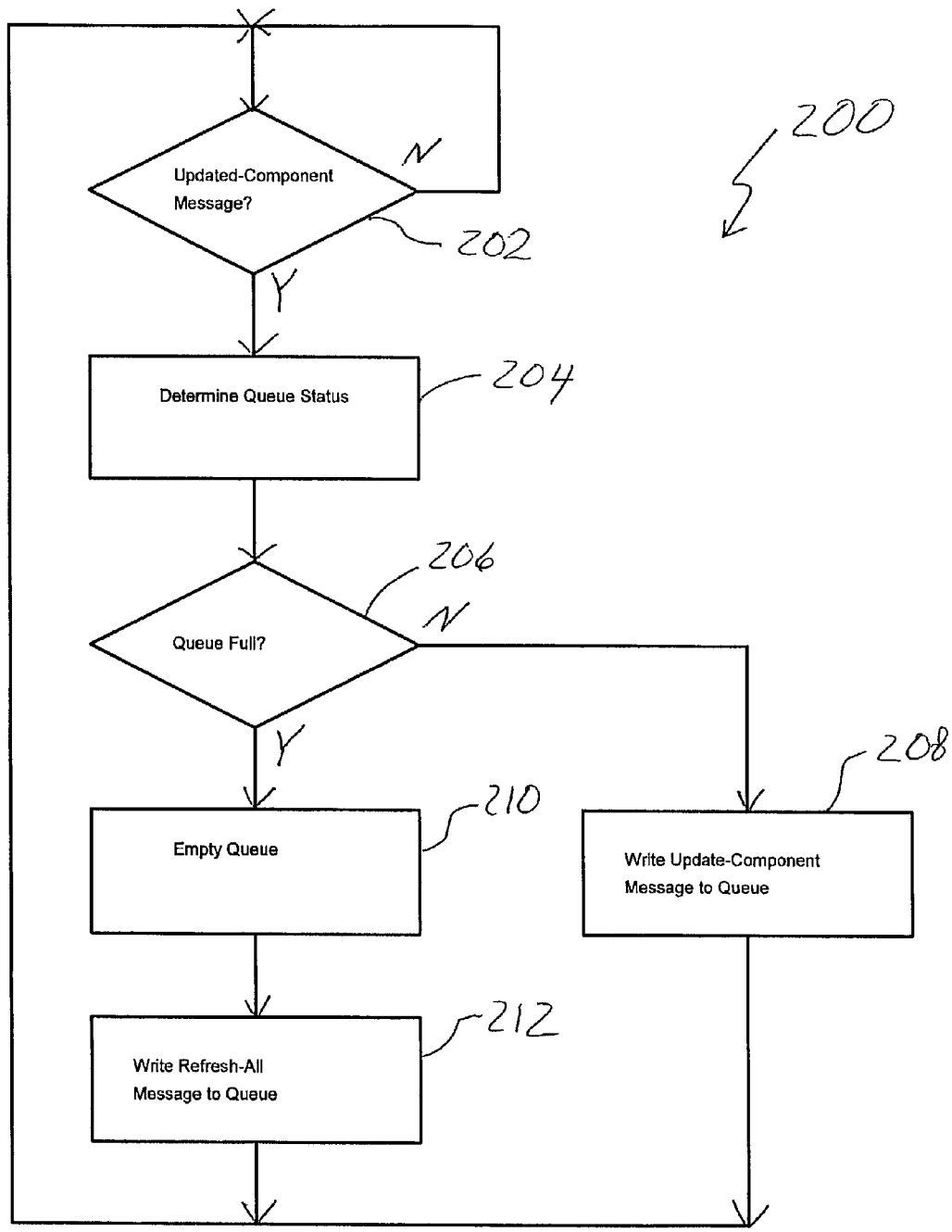
FIG. 2 is a flow diagram of one embodiment of a method of communicating messages using a finite queue.

FIG. 2 is a flow diagram of one embodiment of a method 200 of communicating messages using a finite queue. Method 200 tends to alleviate the negative effects from queue overflows by emptying the finite queue 108 and writing a refresh-all message to the emptied finite queue 108 when the finite queue 108 is full. Method 200 can be implemented as a part of a source process 102. When an update-component message is to be written to the finite queue 108 (checked in block 202), method 200 determines the current status of the finite queue 108 (block 204). The current status indicates if the finite queue 108 is full or not. In one implementation, current status of the finite queue 108 is determined before an attempt to write the update-component to the finite queue 108 occurs. In such an implementation, a counter, flag, or other indicator is checked to determine if the queue is full before attempting to write the update-component message. In another implementation, the current status of the queue is determined after or during an attempt to write the update-component message to the finite queue 108. In such an implementation, the current status of the finite queue 108 is determined by checking for an error code (or other signal) returned by a function or method that attempts to write the update-component message to the finite queue 108.

If the finite queue 108 is not full (checked in block 206), the update-component message is written to the finite queue 108 (block 208). The update-component message, in one implementation, is written to the finite queue 108 after a counter, flag, or other indicator is checked and a determination has been made that the queue 108 is not full. In another implementation, the update-component message is written to the finite queue before or while the determination of the current status of the queue 108 is made. For example, in one such implementation, the update-component message is written to the finite queue 108 and a return code (or other signal) is returned indicating that the write operation was successful. The return code indicates that the queue was able to store the update-component message. In other words, the queue was not full at the time the write operation occurred. Then method 200 then waits for the next update-component message (looping back to block 202).

If the finite queue 108 is full, the finite queue 108 is emptied (block 210) and a refresh-all message is written to the finite queue 108 (block 212). In one implementation, the queue is emptied by deleting or otherwise removing each message stored in the queue. In other implementations, the queue 108 is emptied in other ways. For example, in one such implementation, the queue 108 is emptied by repositioning a pointer or by setting a counter to a value associated with an empty status.

Figure 3:
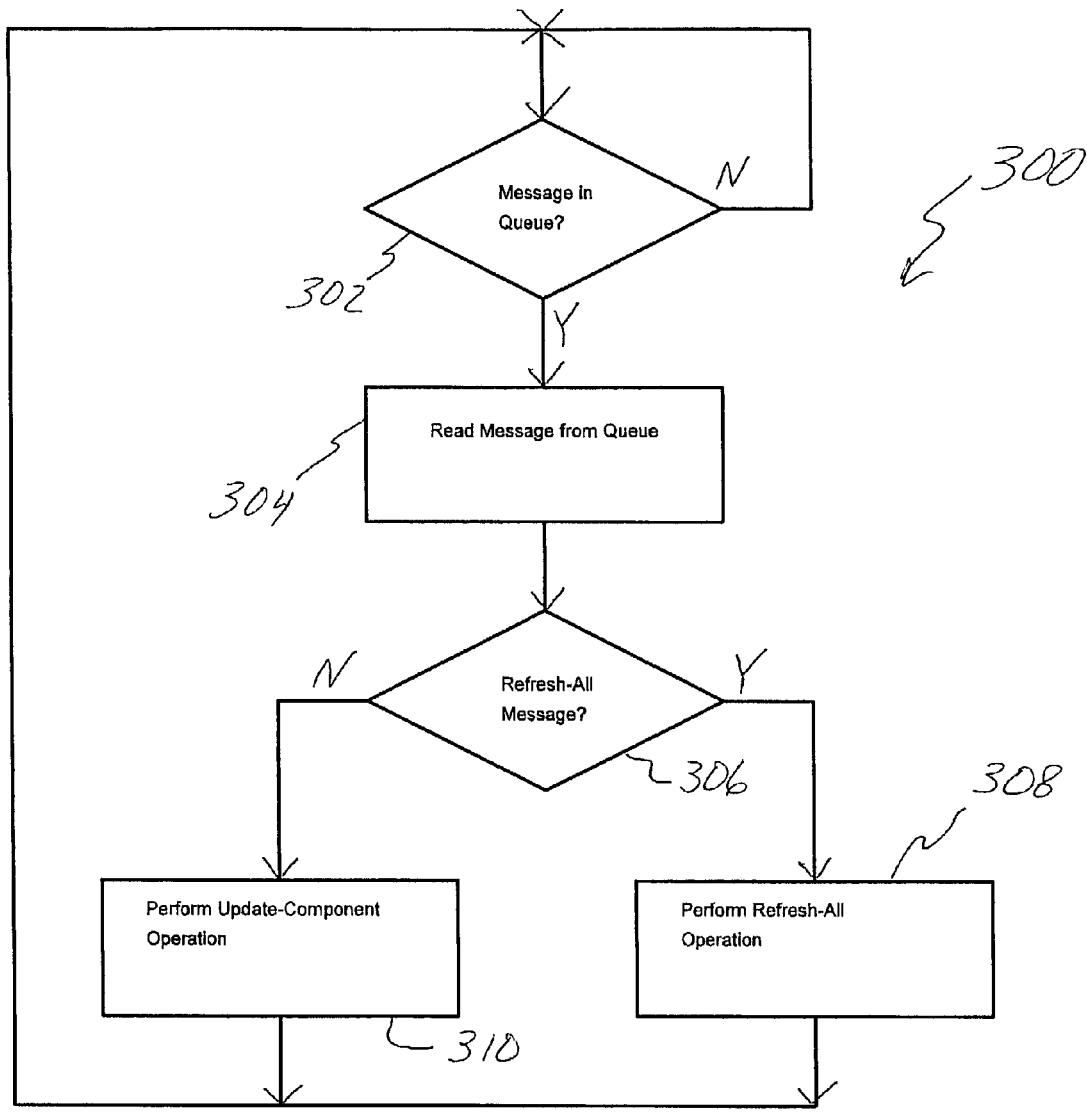
FIG. 3 is a flow diagram of one embodiment of a method of reading messages from a finite queue.

FIG. 3 is a flow diagram of one embodiment of a method 300 of reading messages from a finite queue 108. Method 300 can be used in conjunction with method 200. Method 300 can be implemented as a part of a sink process 106. When there is at least one message in the finite queue 108 (checked in block 302), the method 300 retrieves a message from the finite queue 108 (block 304). For example, in one embodiment where the finite queue 108 is implemented as a first-in-first-out (FIFO) queue, the message that was first written into the queue is received. If the received message is a refresh-all message (checked in block 306), a refresh-all operation is performed (block 308). For example, in an embodiment where a sink process 106 manages a user interface as described above, when the received message is a refresh-all, the sink process 102 retrieves each item of data stored in the database used to draw the entire user interface by requesting such items from the database manager. The sink process 106 then uses the retrieved items to display each user interface component from which the user interface is constructed. After the refresh-all operation is performed, the user interface is fully updated and subsequent processing can continue. If the received message is an update-component message, an update-component operation is performed (block 310). For example, in an embodiment where a sink process 106 manages a user interface as described above, when the received message is an update-component message, the sink process 106 retrieves any items of data stored in the database that are used to draw the component associated with the update-component message by requesting such items from the database manager. The sink process 106 then uses the retrieved items to display the component of the user interface associated with the update-component message. Embodiments of method 200 and method 300 can improve the reliability with which communications can occur using a finite queue.

Figure 4:
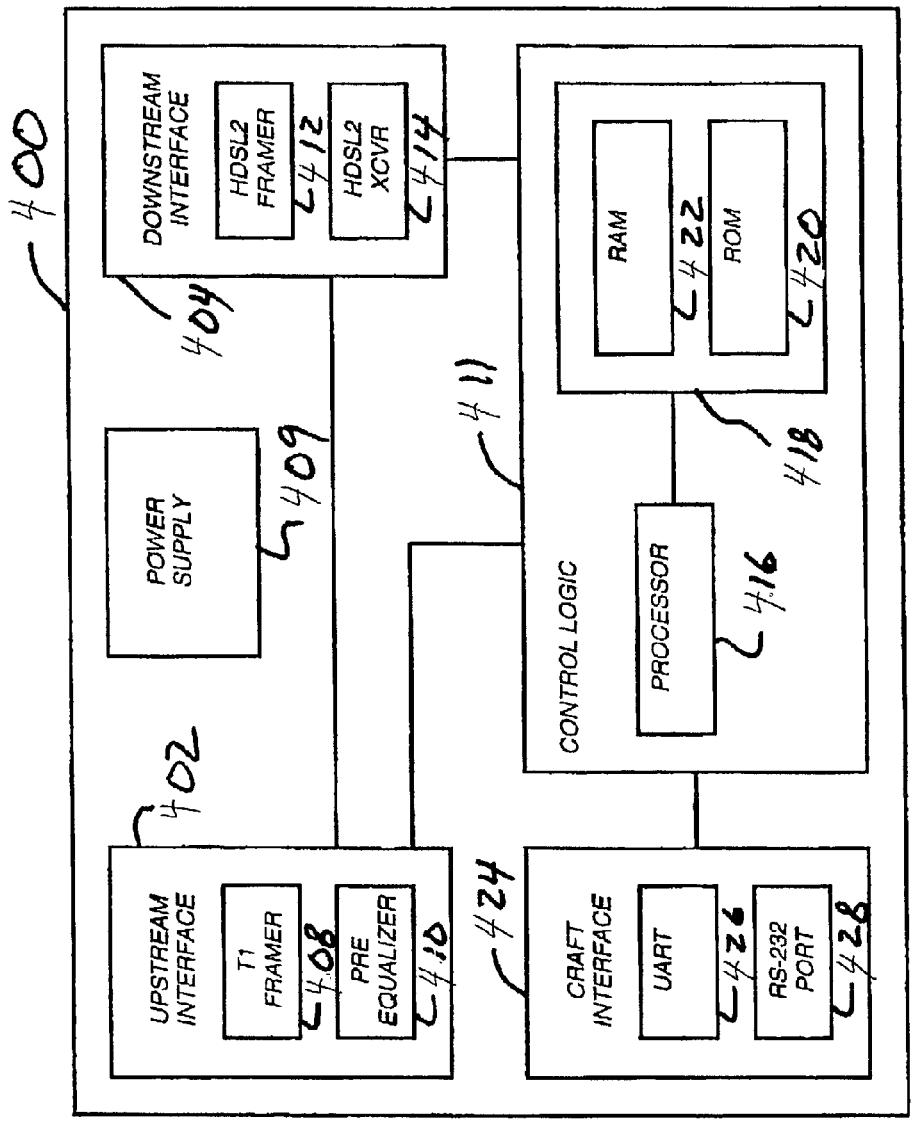
FIG. 4 is a block diagram of one embodiment of an HDSL2 line interface card.

FIG. 4 is a block diagram of one embodiment of an HDSL2 line interface card ("line card") 400 that can be used to implement the methods and systems described here. Line interface card 400 is used to send and receive DS1 traffic over an HDSL2 communication link using a single twisted-pair telephone line. The line card 400 includes an upstream interface 402 and a downstream interface 404. Upstream interface 402 and downstream interface 404 couple the line interface card 400 to an upstream link and a downstream link, respectively. In the embodiment shown in FIG. 4, the upstream link is a DSX-1 link that is cross-connected to a time division-multiplexing network. The upstream interface 402 couples the line card 400 to the DSX-1 link and includes, for example, a T1 framer 408 and a DSX-1 pre-equalizer 410. The downstream link is an HDSL2 link. The downstream interface 404 couples the line card 400 to the HDSL2 link and includes, for example, an HDSL2 framer 412 and an HDSL2 transceiver 414.

The line card 400 includes a power supply 409 for providing power to the components of the line card 400. The line card 400 also includes control logic 411. Control logic 411 includes a programmable processor 416 and a memory 418. Memory 418 includes both read-only memory ("ROM") 420 and random access memory ("RAM") 422. In addition, the line card 400 includes a craft interface 424. Craft interface 424 includes, for example, a universal asynchronous receiver-transmitter ("UART") 426 that couples an RS-432 serial port 428 to the processor 416.

In one embodiment, an embedded control program is executed on programmable processor 416. Program instructions that implement, and data structures used by, the embedded control program are stored in memory 418. For example, in one implementation of such an embodiment, the embedded control program manages a user interface that allows a user to view and change system settings and view system performance, history, alarm, and inventory data. In such an implementation, the embedded control program includes a sink process, finite queue, and source process of the type described above in connection with FIG. 1 above and FIGS. 3 and 4 below. In such an implementation, the user interface is displayed on a device coupled to the line interface card 400. For example, a user can connect a portable computer or other data terminal to the serial port 428 and communicate with an embedded control program executing on the programmable processor 416. Alternatively, the user can communicate with the embedded control program over an embedded operations channel carried among the DS1 traffic handled by the line card 400, for example, by using a personal computer that is in communication with the embedded operations channel. In both cases, the embedded control program displays a user interface on the device coupled to the line interface card 400 and receives input therefrom.

Although FIG. 4 depicts an HDSL2 line interface card, other telecommunications devices can be used to implement the techniques described here. For example, G.SHDSL, HDSL, HDSL4, asynchronous digital subscriber line (ADSL), plain old telephone service (POTS), integrated services digital network (ISDN), and cable-modem line interface cards can be used. Moreover, the techniques described herein may be implemented in a variety of other applications and systems in which a source process provides messages via a finite queue for a decoupled sink process and an overflow condition may result in the queue.

Various alternate embodiments may be used in connection with the present invention. For example, in one embodiment, source and sink processes run on a single system or hardware device, or a source process or a component thereof runs on one device while a sink process or a component thereof runs on another device or system. In another example, a network management system is used to locate a queue on either a hardware device such as line card or on a computer running an element management or network management system, or the like. In connection with one embodiment implemented using line interface unit 400 of FIG. 4, embodiments of method 200 and method 300 are implemented as program instructions stored in memory 418 and executed on programmable processor 416. In such an embodiment, a finite queue is stored in memory 418, for example, and a user interface is displayed on an output device (such as a computer connected to the craft port or a computer communicating with the line interface unit 400 over an embedded operations channel). Although specific embodiments in which the source and sink processes involve a database manager process in communication with a graphical user interface process are described here, it is to be understood that other embodiments exist.

The methods and techniques described here may be implemented in digital electronic circuitry, or with a programmable processor (for example, a special-purpose processor or a general-purpose process such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of managing a queue, comprising:
   when the queue is full:
     emptying the queue; and
     writing a refresh-all message into the queue;
   wherein the refresh-all message indicates that a refresh-all operation should be performed;
   wherein the refresh-all operation causes a refresh operation to be performed for each member of a set of objects;
   wherein the set of objects includes a set of components of a user interface; and
   wherein the refresh-all operation is performed by updating and displaying each member of the set of components of the user interface.

2. The method of claim 1, wherein the refresh-all operation is to be performed by a sink process.

3. The method of claim 1, wherein when the queue is not full, an update-component message is written to the queue.

4. The method of claim 3, wherein the update-component message indicates that an update-component operation should be performed.

5. The method of claim 1, wherein the queue is a finite queue.

6. The method of claim 1, wherein the refresh-all message is written to the queue by a source process.

7. The method of claim 6, wherein source process includes a database manager.

8. A program product comprising a storage medium tangibly embodying program instructions for managing a queue used for storing messages, the program instructions including instructions operable to cause at least one programmable processor to:
   when the queue is full:
     empty the queue; and
     write a refresh-all message into the queue;
   wherein the refresh-all message indicates that a refresh-all operation should be performed;
   wherein the refresh-all operation causes a refresh operation to be performed for each member of a set of objects;
   wherein the set of objects includes a set of components of a user interface; and
   wherein the refresh-all operation is performed by updating and displaying each member of the set of components of the user interface.

9. The program product of claim 8, wherein the refresh-all operation is to be performed by a sink process.

10. The program product of claim 8, wherein the program instruction further include program instruction operable to cause the programmable process to, when the queue is not full, write an update-component message to the queue.

11. The program product of claim 10, wherein the update-component message indicates that an update-component operation should be performed.

12. The program product of claim 8, wherein the queue is a finite queue.

13. The program product of claim 8, wherein the refresh-all message is written to the queue by a source process.

14. The program product of claim 13, wherein source process includes a database manager.

15. A line interface unit, comprising:
   an upstream interface to couple the line interface unit to an upstream communication link;
   a downstream interface to couple the line interface unit to a downstream communication link;
   an input-output interface to couple the line interface unit to an external device;
   a programmable processor coupled to the upstream interface, the downstream interface, and the input-output interface; and
   a storage medium coupled to the programmable processor, tangibly embodying program instructions;

wherein the program instructions include instructions operable to cause the programmable processor to:
  when a queue is full:
    empty the queue; and
    write a refresh-all message into the queue;
wherein the refresh-all message indicates that a refresh-all operation should be performed;
wherein the refresh-all operation causes a refresh operation to be performed for each member of a set of objects.
wherein the set of objects includes a set of components of a user interface; and
wherein the refresh-all operation is performed by updating and displaying each member of the set of components of the user interface.

16. The line interface unit of claim 15, wherein the refresh-all operation is to be performed by a sink process.

17. The line interface unit of claim 15, wherein when the queue is not full, an update-component message is written to the queue.

18. The line interface unit of claim 17, wherein the update-component message indicates that an update-component operation should be performed.

19. The line interface unit of claim 15, wherein the queue is a finite queue.

20. The line interface unit of claim 15, wherein the refresh-all message is written to the queue by a source process.

21. The line interface unit of claim 20, wherein source process includes a database manager.

22. The line interface card of claim 15, wherein the upstream communication link is a DSX-1 link and the upstream interface includes:
  a T1 framer in communication with the downstream interface and to communicate with the DSX-1 link; and
  a pre-equalizer coupled to the T1 framer and the downstream interface and to communicate with the DSX-1 link.

23. The line interface card of claim 15, wherein the downstream communication link is an HDSL2 link and the downstream interface includes:
  an HDSL2 framer in communication with the upstream interface and to communicate with the HDSL2 link; and
  an HDSL2 transceiver coupled to the HDSL2 framer and to communicate with the HDSL2 link.

24. A system, comprising:
  a source process;
  a sink process; and
  a queue coupled to the source process and the sink process;
  wherein the source process, when the queue is full, empties the queue and writes a refresh-all message to queue; and
  wherein the sink process reads the refresh-all message from the queue and performs a refresh-all operation in response to refresh-all message.
wherein the refresh-all message indicates that a refresh-all operation should be performed;
wherein the refresh-all operation causes a refresh operation to be performed for each member of a set of objects;
wherein the set of objects includes a set of components of a user interface; and
wherein the refresh-all operation is performed by updating and displaying each member of the set of components of the user interface.

25. A method of managing a queue, comprising:
  when the queue is full:
    emptying the queue; and
    writing a refresh-all message into the queue;
  wherein when the queue is not full, an update-component message is written to the queue; and
  wherein the update-component message indicates that an update-component operation should be performed.

26. A program product comprising a storage medium tangibly embodying program instructions for managing a queue used for storing messages, the program instructions including instructions operable to cause at least one programmable processor to:
  when the queue is full:
    empty the queue; and
    write a refresh-all message into the queue;
  wherein the program instruction further include program instruction operable to cause the programmable process to, when the queue is not full, write an update-component message to the queue; and
  wherein the update-component message indicates that an update-component operation should be performed.

27. A line interface unit, comprising:
  an upstream interface to couple the line interface unit to an upstream communication link;
  a downstream interface to couple the line interface unit to a downstream communication link;
  an input-output interface to couple the line interface unit to an external device;
  a programmable processor coupled to the upstream interface, the downstream interface, and the input-output interface; and
  a storage medium coupled to the programmable processor, tangibly embodying program instructions;
  wherein the program instructions include instructions operable to cause the programmable processor to:
    when a queue is full:
      empty the queue; and
      write a refresh-all message into the queue;
  wherein when the queue is not full, an update-component message is written to the queue; and
  wherein the update-component message indicates that an update-component operation should be performed.

* * * * *